US012630034B2

(12) United States Patent
Hunkel

(10) Patent No.: US 12,630,034 B2
(45) Date of Patent: May 19, 2026

(54) DRIVERLESS GROUND VEHICLE FOR TRANSMITTING ELECTRICAL ENERGY TO AN AIRCRAFT

(71) Applicant: Airbus Defence and Space GmbH, Taufkirchen (DE)

(72) Inventor: Peter Hunkel, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 149 days.

(21) Appl. No.: 18/578,175

(22) PCT Filed: Jun. 24, 2022

(86) PCT No.: PCT/EP2022/067304
§ 371 (c)(1),
(2) Date: Jan. 10, 2024

(87) PCT Pub. No.: WO2023/285106
PCT Pub. Date: Jan. 19, 2023

(65) Prior Publication Data
US 2024/0246696 A1 Jul. 25, 2024

(30) Foreign Application Priority Data
Jul. 12, 2021 (DE) ..................... 10 2021 117 950.5

(51) Int. Cl.
B60L 53/35 (2019.01)
B60L 53/16 (2019.01)
B64F 1/35 (2024.01)

(52) U.S. Cl.
CPC ............... B60L 53/35 (2019.02); B60L 53/16 (2019.02); B64F 1/352 (2024.01); B60L 2200/10 (2013.01)

(58) Field of Classification Search
CPC ...... B60L 53/35; B60L 53/16; B60L 2200/10; B60L 2260/32; B64F 1/352; Y02T 10/70; Y02T 10/7072; Y02T 90/14
See application file for complete search history.

(56) References Cited

U.S. PATENT DOCUMENTS

| | | | |
|---|---|---|---|
| 6,424,891 B1 | 7/2002 | Sargent et al. | |
| 10,822,118 B2 | 11/2020 | Rosenberg | |

(Continued)

FOREIGN PATENT DOCUMENTS

| | | |
|---|---|---|
| DE | 3423867 A1 | 1/1986 |
| DE | 102016221829 A1 | 5/2018 |

(Continued)

OTHER PUBLICATIONS

International Search Report for PCT/EP2022/067304 mailed Sep. 30, 2022. 3 pgs.

*Primary Examiner* — Michael C Zarroli
(74) *Attorney, Agent, or Firm* — Lerner David LLP

(57) ABSTRACT

A driverless ground vehicle for coupling to an aircraft has a vehicle base, a chassis with wheels that is arranged on the vehicle base, a control unit, a drive, an electrical energy store, and a coupling unit. The drive is coupled to the chassis for moving the wheels. The coupling unit is arranged on the vehicle base and carries an electrical line to be connected to the electrical energy store and has a first electrical connector at a distal end. The coupling unit is designed to move the first electrical connector for coupling to a second electrical connector. The control unit is connected to the drive and the coupling unit to control the drive to move the ground vehicle to the aircraft and to control the coupling unit to move the first connector into a predefinable position on the aircraft to establish an electrical connection to the second electrical connector.

15 Claims, 2 Drawing Sheets

(56) References Cited

U.S. PATENT DOCUMENTS

| | | |
|---|---|---|
| 2012/0303397 A1 | 11/2012 | Prosser |
| 2017/0158354 A1 | 6/2017 | Bourne et al. |
| 2018/0126858 A1 | 5/2018 | Blum et al. |
| 2018/0134413 A1 | 5/2018 | Halsey et al. |
| 2020/0055594 A1 | 2/2020 | Tal et al. |
| 2020/0346551 A1 | 11/2020 | Nestel |
| 2020/0361329 A1 | 11/2020 | Schütz et al. |
| 2022/0380064 A1* | 12/2022 | Alecu .................... B60L 50/60 |

FOREIGN PATENT DOCUMENTS

| | | |
|---|---|---|
| EP | 4095046 A1 | 11/2022 |
| WO | 2018/198126 A1 | 11/2018 |
| WO | 2019/038532 A1 | 2/2019 |

* cited by examiner

DRIVERLESS GROUND VEHICLE FOR TRANSMITTING ELECTRICAL ENERGY TO AN AIRCRAFT

CROSS-REFERENCE TO RELATED APPLICATIONS

The present application is a national phase entry under 35 U.S.C. § 371 of International Application No. PCT/EP2022/067304, filed Jun. 24, 2022, published in German, which claims priority to German Application No. 10 2021 117 950.5 filed Jul. 12, 2021, the disclosures of which are incorporated herein by reference in their entireties.

TECHNICAL FIELD

The invention relates to a driverless ground vehicle, to an energy transmission system, and to a method for transmitting energy from a ground vehicle to an aircraft.

BACKGROUND OF THE INVENTION

Concepts for designing commercial aircraft with hybrid-electric or all-electric drives are known. One of the technological challenges is the comparatively low energy and power density of electrical energy sources, such as batteries or hydrogen fuel cells. This can lead to a high weight of the commercial aircraft, in which case in particular flight phases with a high peak power requirement, for example at take-off, are also dimensioning.

SUMMARY OF THE INVENTION

It is an object of the invention to propose an energy-supplying apparatus which is capable of reducing the weight of a hybrid-electric or all-electric commercial aircraft as much as possible.

The object is achieved by a driverless ground vehicle having the features described below. Advantageous embodiments and developments can be gathered from the following description.

A driverless ground vehicle for coupling to an aircraft on the ground is proposed, having a vehicle base, a chassis with wheels that is arranged on the vehicle base, a control unit, a drive, an electrical energy store, and a coupling unit, wherein the drive is coupled to the chassis for moving the wheels, wherein the coupling unit is arranged on the vehicle base and carries an electrical line which can be connected to the electrical energy store and has a first electrical connector at a distal end, wherein the coupling unit is designed to move the first electrical connector for coupling to a second electrical connector relative to the vehicle base, and wherein the control unit is connected to the drive and the coupling unit and is designed to control the drive to move the ground vehicle to the aircraft and to control the coupling unit to move the first connector into a predefinable position on the aircraft in order to establish an electrical connection to the second electrical connector located at the predefinable position.

The ground vehicle according to the invention is an apparatus which can move on the ground, for example on a runway or an airfield of an airport, to the relevant aircraft in order to supply it with electrical energy. For this purpose, the ground vehicle is equipped with devices that allow driving on the ground and devices that allow electrical energy to be stored and output.

The vehicle base could form the mechanical basic framework for the ground vehicle. Means for receiving the electrical energy store and the wheels may be arranged thereon. For example, the vehicle base could comprise a housing or a frame, on the underside of which wheels are arranged. The wheels should be selected or designed according to the size, weight and intended speed of the ground vehicle. It may be appropriate to provide two or more axles, on each of which at least two wheels are arranged. The wheels of at least one axle could be steerable, with the result that the ground vehicle can also travel on curved paths.

The drive may comprise at least one traction motor that rotates the wheels selectively. It is conceivable to provide a central traction motor which is coupled to all driven wheels via a transfer gearbox. Alternatively, however, wheel hub motors, which are integrated into the wheel hubs of the wheels, are also conceivable. The drive may further comprise at least one steering motor which is designed to pivot the steerable wheels for steering.

It is preferred if the electrical energy store is a battery or a rechargeable battery and, for example, works on a lithium basis. It is further preferred if the electrical energy store is interchangeably arranged on the vehicle base. In the event of a higher frequency of use of the ground vehicle, electrical energy stores could therefore be charged outside the ground vehicle and the ground vehicle is usually equipped with a fully charged energy store. Alternatively, the electrical energy store may also have a capacitor with a high power density or a high ratio of power density to energy density, i.e. a so-called supercapacitor or ultracapacitor.

The vehicle base can be designed in such a way that it is particularly robust against external mechanical influences and is comparatively insensitive, especially during regular operation at an airport. For example, the vehicle base could have a housing made of sheet steel with a sufficient wall thickness.

The coupling unit has a free end and an attached end with respect to the vehicle base. The attached end is arranged on the vehicle base and could be movable relative to it. For example, the attached end may have a bearing which has at least one vertical pivot axis and/or at least one horizontal pivot axis in order to be able to pivot the coupling element around the relevant pivot axis. As stated further below, the coupling element may have a plurality of arms and/or other means which are movably coupled to each other.

The coupling unit is intended to move the first electrical connector, which is arranged at the free or distal end, relative to the vehicle base. The coupling unit could be, for example, a movable support arm for the electrical line and the first connector, wherein the support arm absorbs the forces and moments of the cable. The aim is to be able to move the ground vehicle to an aircraft autonomously, partially autonomously or in a remote-controlled manner and to couple the first electrical connector there to a second electrical connector arranged on the aircraft, so that electrical energy from the energy store is supplied to the aircraft.

The ground vehicle can already be driven on the apron under or to the aircraft whose engine is about to be started. The ground vehicle can preferably accompany the aircraft over an entire ground phase from taxiing to taking off and can permanently supply the aircraft with electrical energy. Before, shortly before, or during take-off or start-up rotation, the electrical connection to the aircraft could be disconnected and the ground vehicle removed. It can then move back to a predefined starting point, such as a terminal or a charging station. There it could be recharged for the next use.

The capacity of the electrical energy store as well as a possible peak power of the energy store should be designed in such a way that energy can also be transmitted during the entire process, for example during the entire taxiing and start-up process of the aircraft until take-off, whereby preferably the entire electrical energy requirement of the aircraft should be covered by the electrical energy store. The aircraft must then be supplied with on-board energy only after the ground vehicle has been disconnected. The weight and volume of electrical energy stores on board the aircraft are reduced, resulting in a reduction in the overall weight of the aircraft. This is especially true for the weight of energy stores with a high power density, since these stores are heavier than stores with a lower power density with the same capacity. Very high electrical power is usually required, especially in the start-up phase until lift-off, which can then be covered by the external electrical energy store. It is conceivable that the electrical energy store is designed in such a way that a wide range of aircraft can be supplied. The range could extend from regional aircraft to long-haul aircraft.

It is also conceivable that the ground vehicle has a separate traction battery which is dimensioned to always ensure the drive of the ground vehicle regardless of the state of the electrical energy store. This can increase safety and manual transport is not necessary if an electrical energy store is possibly completely empty.

The coupling unit could have an arm having at least two elongated members which can be moved independently of each other and relative to each other. The coupling unit could therefore be constructed like an industrial robot or industrial manipulator. The individual members can be coupled to each other by a joint, wherein the member arranged on the vehicle base can also be connected to the vehicle base via a joint. The joints can be of different design. It is conceivable that the joints each have one, two or three degrees of rotational freedom. In a simple case, a joint located between successive members could have only a single degree of rotational freedom which is on the horizontal, for example. A joint arranged on the vehicle base for carrying the coupling unit could, for example, have two degrees of freedom, wherein one associated rotation axis could be on the vertical and one of the associated rotation axes could be on the horizontal. More than two members are also conceivable. The length of the individual members, their number and the specific design of the joints depend on the actual intended purpose of the ground vehicle. If this is intended for larger commercial aircraft, more members and/or longer members could be provided. If automatic tracking of the ground vehicle is intended while the aircraft is moving, more degrees of freedom in the joints could be useful.

The first electrical connector could be arranged via a joint unit at the distal end of the coupling unit. Consequently, the first electrical connector can be precisely aligned relative to the second electrical connector. An alignment of the first connector and the second connector relative to each other that is carried out solely by aligning the vehicle base is then not absolutely necessary and different positions of the ground vehicle relative to the aircraft are tolerable.

Furthermore, the control unit could be designed to dynamically track the position of the first connector to the predefinable position. The predefinable position could change continuously when the aircraft is moving. If the aircraft is on the runway, the second connector moves continuously. As a result, the once activated position of the first connector only matches the position of the second connector for a brief moment. The control unit is preferably designed to dynamically track the first connector to the changing position of the second connector. Moving the first connector depends on the movement of the second connector. The first connector could be moved in two stages. In the case of an only marginal movement of the aircraft, for example during loading, refueling or the like, which deflects the landing gear of the aircraft, the movement of the coupling unit could be sufficient to track the first connector. However, if the aircraft is taxiing on the ground, the vehicle base must also be tracked by moving the wheels. At the same time, the coupling unit is tracked such that the first connector is always at the predefined position of the second connector. To track the first connector, it is useful that the control unit performs reference navigation and controls the movement of the ground vehicle on the reference navigation. The reference navigation could include one or more sensors in order to determine the position of the second connector. These could include a camera, a LIDAR, a radar or the like. It is conceivable to equip a surface area on the second connector with a marking that is clearly recognizable by a reference navigation unit and facilitates the reference navigation.

The ground vehicle could further have a sensor unit which is coupled to the control unit and is designed to monitor an environment of the ground vehicle for obstacles and, in the event of a detected obstacle, to control the drive to bypass the detected obstacle. This would allow the ground vehicle to be moved to the aircraft without damaging other devices on the ground that are on a planned route of the ground vehicle, if a location of the aircraft as the destination is known.

The ground vehicle could further have a navigation unit which is coupled to the control unit and is designed to provide the control unit with position data for navigation on the ground. The navigation unit could perform satellite-based navigation, in particular in addition to the above reference navigation. The position of the aircraft can thus be transmitted to the ground vehicle, so that the ground vehicle can reach the aircraft independently.

The ground vehicle could also be self-propelled in order to drive from a charging station on the ground to the relevant aircraft. A remote control for moving the ground vehicle is then not necessary. However, this does not preclude the provision of a ground station for monitoring the operation of the ground vehicle, where actions to be carried out, camera images, system status and the like can be monitored. At the same time, it is also conceivable to carry out an intervention or an emergency stop from such a ground station if necessary.

The electrical energy store could be designed to provide an aircraft with an electrical energy of at least 1000 kWh via the first electrical connector. An electric medium-haul aircraft could have an energy consumption up to take-off of 1000 kWh, for example. However, depending on the duration of the taxiing process, depending on climatic environmental conditions and the like, it could also be significantly higher, for example in a range of 1800-3600 kWh. It is particularly preferred if the ground vehicle is adapted to common aircraft sizes and provides a required size of the electrical energy store.

The invention further relates to an energy transmission system having at least one ground vehicle according to the preceding description and at least one charging station which is designed to charge the electrical energy store of the at least one ground vehicle. The charging station could be placed at a terminal so that the ground vehicle can be recharged for the next use at the terminal after returning from the relevant aircraft.

The energy transmission system could have at least one second electrical connector which can be integrated into an aircraft, wherein the first electrical connector and the second electrical connector are designed to be complementary to each other. In particular, the connectors could be pluggable into each other. It could be appropriate to provide a locking element on the first connector, with which the first connector and the second connector can be locked to each other. The locking could be designed in such a way that a pulling movement or the like releases the locking. However, it is also conceivable to implement another control channel that actuates an actuator for actively releasing the locking. The second connector is preferably electrically connected to an electrical high-performance system of the aircraft. The aircraft could be electrically or hybrid-electrically operated.

The at least one charging station could have a second electrical connector and the ground vehicle could be designed to couple the first electrical connector to the second electrical connector on the charging station for the purpose of charging the electrical energy store. Consequently, the ground vehicle can be connected to the charging station in the same way as to an aircraft.

In analogy to the previous statements, the invention also relates to a method for transmitting energy from a ground vehicle to an aircraft, comprising driving the ground vehicle to the aircraft by means of a drive, actuating a coupling unit on the ground vehicle for the purpose of moving a first electrical connector arranged at a distal end of the coupling unit to a second electrical connector arranged on the aircraft at a predefinable position, coupling the first electrical connector and the second electrical connector, and outputting electrical energy from an electrical energy store arranged in the ground vehicle to the aircraft.

The method could also comprise dynamic tracking of the position of the first connector to the predefinable position. This is preferably carried out by controlling the coupling unit and, if necessary, the wheels by means of reference navigation.

The method could also comprise the taxiing of the aircraft, wherein the ground vehicle follows the taxiing of the aircraft.

The method could further comprise uncoupling the first electrical connector from the second electrical connector after electrical energy has been output and moving back to the charging station.

BRIEF DESCRIPTION OF THE FIGURES

Further features, advantages and possible applications of the present invention emerge from the following description of the exemplary embodiments and the figures. In this case, all of the features described and/or illustrated in the figures form the subject matter of the invention individually and in any desired combination, even regardless of their combination in the individual claims or their back-references. Furthermore, in the figures, the same reference signs are used for the same or similar objects.

DETAILED DESCRIPTION OF EXEMPLARY EMBODIMENTS

Figure 1:
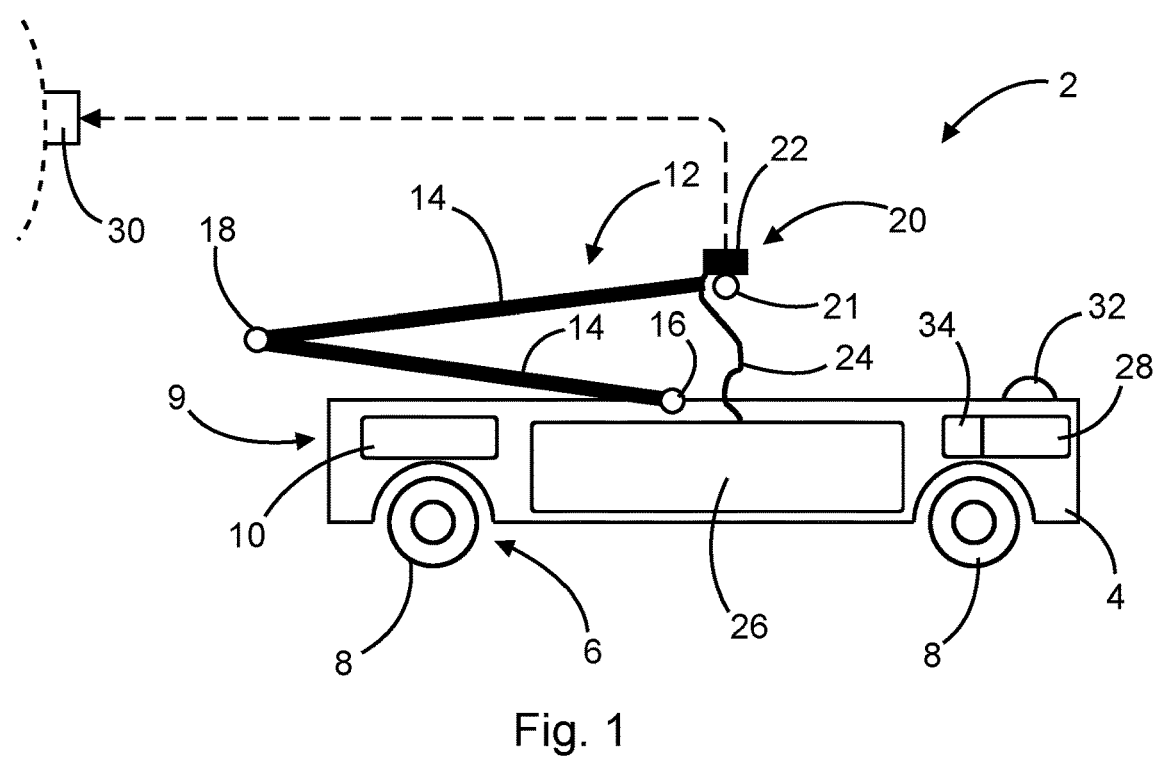
FIG. 1 shows a schematic side view of a ground vehicle.

FIG. 1 shows a driverless ground vehicle 2 for coupling to an aircraft on the ground. The ground vehicle 2 has a vehicle base 4 which comprises, for example, a vehicle frame with a housing located thereon. A chassis 6 with wheels 8 is arranged on the vehicle base 4. These are coupled to a drive 9 which has, inter alia, a traction motor 10 to drive the wheels 8. At least one pair of wheels is steerable, for which the drive 9 comprises, for example, a steering gear and a steering drive (not shown). As a result, the ground vehicle 2 can also travel on curved paths.

A coupling unit 12 is arranged on the top side of the ground vehicle 2 and is equipped with, for example, two elongated members 14 which can be moved independently of each other and relative to each other. A member 14 is connected directly to the vehicle base 4 via a first joint 16. A second joint 18 is arranged between the two members 14 and can be used to move the two members 14 relative to each other. Both members 14 can be placed onto a top side of the ground vehicle 2 in a manner folded on top of each other, if no transmission of electrical energy is desired, for example in a resting or charging state.

A first electrical connector 22 is arranged at a distal end 20 of the coupling unit 12. The first electrical connector 22 could be arranged on the outer member 14 via a joint unit, for example a third joint 21. It is connected to an electrical line 24 which, however, is coupled to an electrical energy store 26. A control unit 28 is provided and is coupled to the traction motor 10 and the coupling unit 12 in order to move the vehicle 2 to an aircraft and to connect the first connector 22 to a second connector 30 arranged on the aircraft by moving the members 14 or all joints, as schematically indicated here.

The control unit 28 could be designed to allow the ground vehicle 2 to be self-propelled. For this purpose, the control unit 28 could perform reference navigation. For this purpose, one or more sensors 32 are provided and can be used by the ground vehicle 2 to capture signals needed for navigation. In particular, the ground vehicle 2 could comprise a navigation unit 34 which is part of the control unit 28 or constitutes a separate module connected thereto. The navigation unit 34 could perform both the reference navigation and ground navigation from a charging station to an aircraft.

The electrical energy store 26 can store, for example, at least 1000 kWh of electrical energy, preferably even more. It could be dimensioned in such a way that all conceivable intended purposes can be covered, i.e. all possible sizes of aircraft, which can range from regional aircraft to long-haul aircraft.

Figure 2:
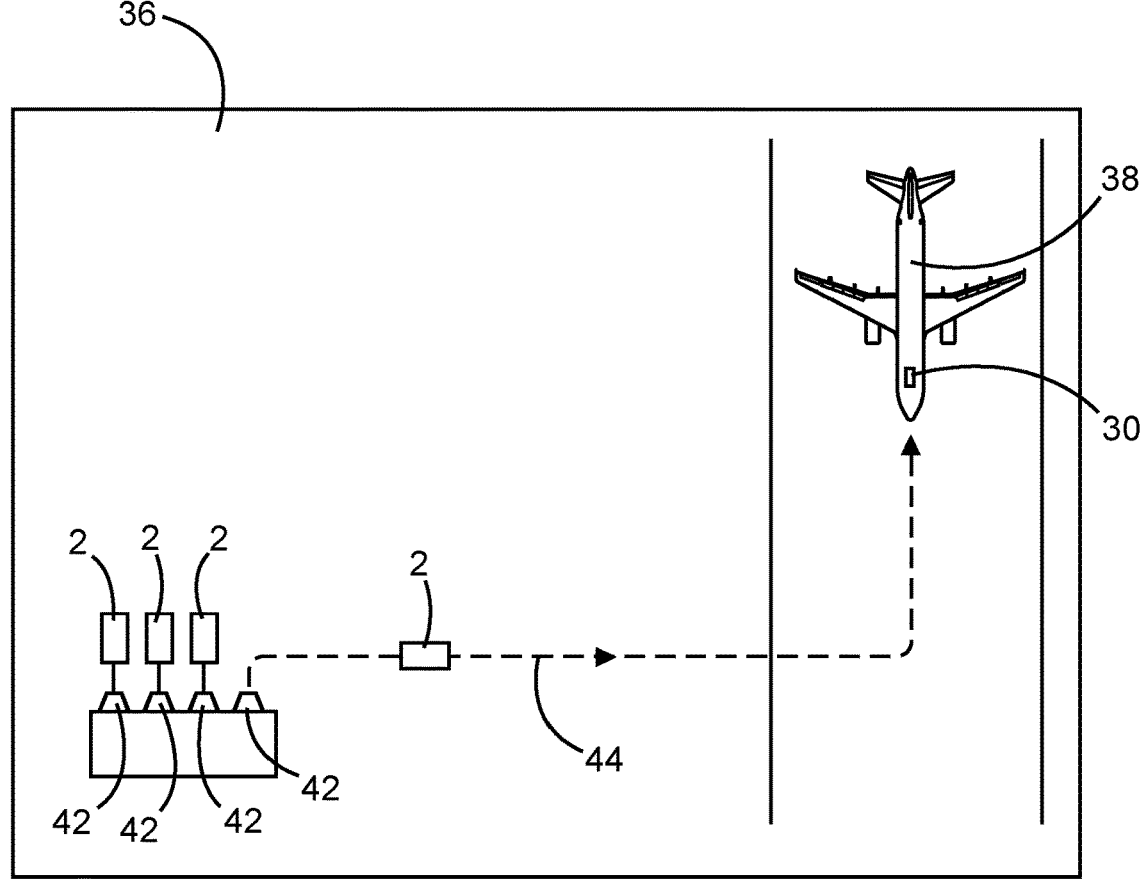
FIG. 2 shows a runway with a terminal, a plurality of ground vehicles and a commercial aircraft.

FIG. 2 shows a section of a runway 36, on which a commercial aircraft 38 is located. The commercial aircraft 38 is at a distance from a terminal 40 and is about to carry out a taxiing process. Charging stations 42, at which a ground vehicle 2 is charged in each case, are provided at the terminal 40. One of the ground vehicles 2 is here detached from its charging station 42 and is located on a route 44 on the runway 36 to the commercial aircraft 38. It preferably moves autonomously or partially autonomously along the route 44.

The commercial aircraft 38 has, for example on its underside, a second electrical connector 30, to which the ground vehicle 2 can be connected. The ground vehicle 2 moves, for instance, under the fuselage of the commercial aircraft 38, where it extends the coupling unit 12 by moving the members 14 in order to align the first electrical connector 22 with the second electrical connector 30 and to couple both connectors.

The control unit 28 and the navigation unit 34 are designed to follow a movement of the commercial aircraft 38 in order to disconnect the connection between the two connectors 22 and 30 shortly before or during the take-off of the commercial aircraft 38. The ground vehicle 2 can then drive back to the relevant charging station 42. For the entire taxiing process until take-off, the commercial aircraft 38 therefore requires less electrical energy stored on board and can thus save some of the weight.

Figure 3:
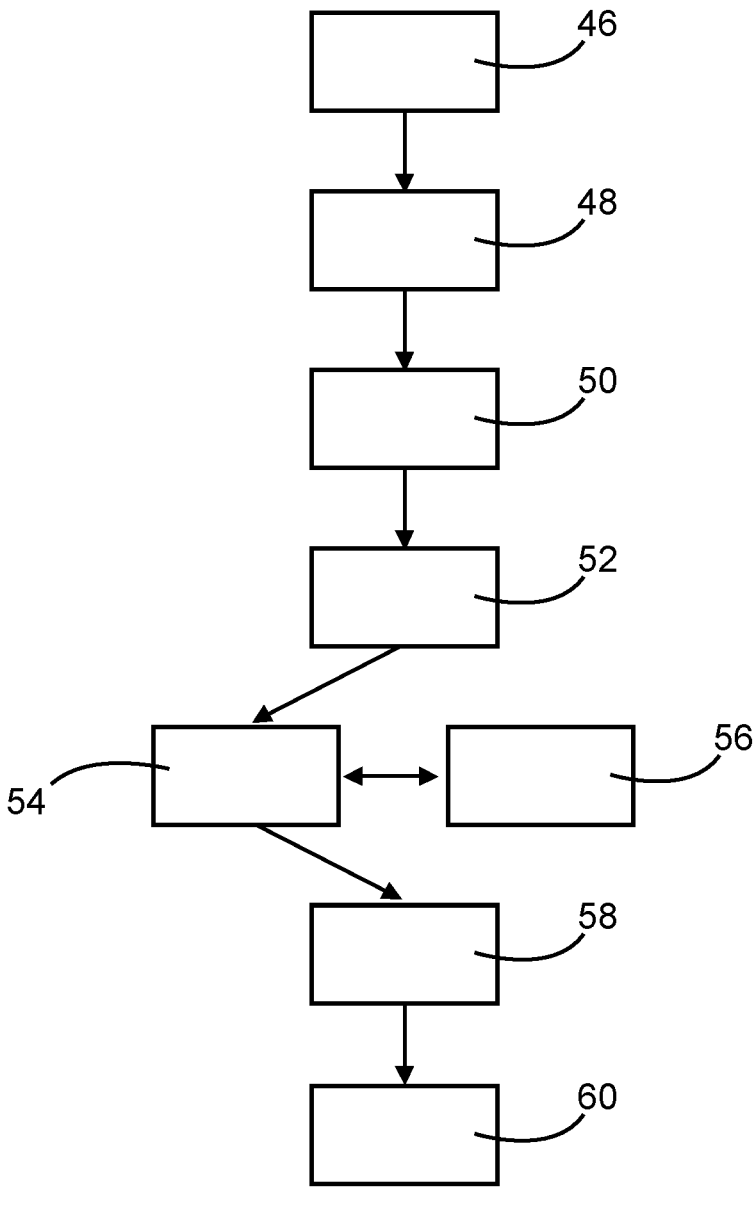
FIG. 3 shows a schematic, block-based representation of a method for transmitting energy from a ground vehicle to an aircraft.

FIG. 3 shows a schematic, block-based representation of a method for transmitting energy from the ground vehicle 2 to the aircraft 38. The method comprises the steps of driving 46 the ground vehicle 2 to the aircraft 38 by means of the drive 9, actuating 48 a coupling unit 12 on the ground vehicle 2 for the purpose of moving a first electrical connector 22 arranged at the distal end of the coupling unit 12 to the second electrical connector 30 arranged on the aircraft 38 at a predefinable position, coupling 50 the first electrical connector 22 and the second electrical connector 30, and outputting 52 electrical energy from an electrical energy store 26 arranged in the ground vehicle 2 to the aircraft 38. Further, the method may also comprise the dynamic tracking 54 of the position of the first connector 22 to the predefinable position. The aircraft 38 can carry out taxiing 56, for instance, wherein the ground vehicle 2 follows the taxiing of the aircraft 38. The method may finally comprise uncoupling 58 the first electrical connector 22 from the second electrical connector 30 after electrical energy has been output and moving back 60 to the charging station 42.

REFERENCE SIGNS

2 Ground vehicle
4 Vehicle base
6 Chassis
8 Wheel
9 Drive
10 Traction motor
12 Coupling unit
14 Member
16 First joint
18 Second joint
20 Distal end
21 Third joint/joint unit
22 First electrical connector
24 Electrical line
26 Electrical energy store
28 Control unit
30 Second electrical connector
32 Sensor
34 Navigation unit
36 Runway
38 Commercial aircraft
40 Terminal
42 Charging station
44 Route
46 Drive
48 Actuate the coupling unit
50 Couple the connectors
52 Output electrical energy
54 Dynamic tracking
56 Taxiing
58 Uncouple
60 Drive back

The invention claimed is:

1. A driverless ground vehicle for coupling to an aircraft on the ground, comprising:
   a vehicle base, a chassis with a plurality of wheels, the chassis arranged on the vehicle base,
   a control unit,
   a drive,
   a navigation unit coupled to the control unit,
   an electrical energy store, and
   a coupling unit,
   wherein the drive is coupled to the chassis for moving the plurality of wheels,
   wherein the coupling unit is arranged on the vehicle base and carries an electrical line configured to be connected to the electric energy store and has a first electrical connector at a distal end,
   wherein the coupling unit is configured to move the first electrical connector for coupling to a second electrical connector relative to the vehicle base,
   wherein the control unit is connected to the drive and the coupling unit and is configured to control the drive to move the ground vehicle to the aircraft and to control the coupling unit to move the first connector into a predefinable position on the aircraft to establish an electrical connection to the second electrical connector located at the predefinable position, and
   wherein the ground vehicle is configured to accompany the aircraft, independent of the aircraft, throughout the entire ground phase from taxiing to takeoff in a self-propelling manner relying on the navigation unit and to continuously supply the aircraft with electrical energy.

2. The ground vehicle as claimed in claim 1, wherein the coupling unit comprises an arm having at least two elongated members configured to be moved independently of each other and relative to each other.

3. The ground vehicle as claimed in claim 1, wherein the first electrical connector is arranged via a joint unit at the distal end of the coupling unit.

4. The ground vehicle as claimed in claim 1, wherein the control unit is configured to dynamically track the position of the first connector to the predefinable position.

5. The ground vehicle as claimed in claim 1, further comprising a sensor unit coupled to the control unit and configured to monitor an environment of the ground vehicle for obstacles and, in the event of a detected obstacle, to control the drive to bypass the detected obstacle.

6. The ground vehicle as claimed claim 1, further comprising a navigation unit coupled to the control unit and is configured to provide the control unit with position data for navigation on the ground.

7. The ground vehicle as claimed in claim 1, wherein the ground vehicle is self-propelled to drive from a charging station on the ground to the relevant aircraft.

8. The ground vehicle as claimed in claim 1, wherein the electric energy store is configured to provide an aircraft with an electrical energy of at least 1000 kWh via the first electrical connector.

9. An energy transmission system comprising:
   at least one ground vehicle as claimed in claim 1, and
   at least one charging station configured to charge the electrical energy store of the at least one ground vehicle.

10. The energy transmission system as claimed in claim 9, further comprising the second electrical connector configured to be integrated into the aircraft, wherein the first electrical connector and the second electrical connector are configured to be complementary to each other.

11. The energy transmission system as claimed in claim 9, wherein the at least one charging station comprises a third electrical connector and the ground vehicle is configured to couple the first electrical connector to the third electrical connector on the charging station for the purpose of charging the electrical energy store.

12. A method for transmitting energy from a ground vehicle to an aircraft, comprising:

driving the ground vehicle to the aircraft by a drive, actuating a coupling unit on the ground vehicle for moving a first electrical connector arranged at a distal end of the coupling unit to a second electrical connector arranged on the aircraft at a predefinable position, coupling the first electrical connector and the second electrical connector, and outputting electrical energy from an electrical energy store arranged in the ground vehicle to the aircraft, wherein the ground vehicle accompanies the aircraft, independent of the aircraft, throughout the entire ground phase from taxiing to takeoff in a self-propelling manner relying on a navigation unit and continuously supplies the aircraft with electrical energy.

13. The method as claimed in claim 12, further comprising dynamic tracking of the position of the first connector to the predefinable position.

14. The method as claimed in claim 12, further comprising a taxiing of the aircraft, wherein the ground vehicle follows the taxiing of the aircraft.

15. The method as claimed in claim 12, further comprising uncoupling the first electrical connector from the second electrical connector after electrical energy has been output, and moving the ground vehicle back to the charging station.

\* \* \* \* \*